United States Patent [19]

Weder

[11] Patent Number: 5,598,683
[45] Date of Patent: *Feb. 4, 1997

[54] WRAPPING A FLORAL GROUPING WITH SHEETS HAVING ADHESIVE MATERIAL APPLIED THERETO

[75] Inventor: Donald E. Weder, Highland, Ill.

[73] Assignee: Southpac Trust International, Inc., Highland, Ill.

[ * ] Notice: The term of this patent shall not extend beyond the expiration date of Pat. No. 55,181,364.

[21] Appl. No.: 329,607

[22] Filed: Oct. 25, 1994

Related U.S. Application Data

[63] Continuation-in-part of Ser. No. 253,648, Jun. 3, 1994, abandoned, which is a continuation of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned, which is a continuation-in-part of Ser. No. 219,083, Jul. 13, 1988, Pat. No. 4,897, 031, which is a continuation of Ser. No. 4,275, Jan. 5, 1987, Pat. No. 4,773,182, which is a continuation of Ser. No. 613,080, May 22, 1984, abandoned, said Ser. No. 502,358, is a continuation-in-part of Ser. No. 391,463, Aug. 9, 1989, abandoned, which is a continuation-in-part of Ser. No. 249,761, Sep. 26, 1988, abandoned, which is a continuation-in-part of Ser. No. 219,083, Jul. 13, 1988, Pat. No. 4,897, 031, which is a continuation of Ser. No. 4,275, Jan. 5, 1987, Pat. No. 4,773,182, which is a continuation of Ser. No. 613,080, May 22, 1984, abandoned.

[51] Int. Cl.⁶ .......................... B65B 51/02; B65B 61/06
[52] U.S. Cl. ................................................ 53/397; 53/465
[58] Field of Search ........................... 53/397, 398, 461, 53/462, 465, 399; 206/423, 460; 229/87.01; 47/41.01, 72

[56] References Cited

U.S. PATENT DOCUMENTS

| | | |
|---|---|---|
| Re. 21,065 | 5/1939 | Copeman . |
| 732,889 | 7/1903 | Paver . |
| 1,446,563 | 2/1923 | Hughes . |
| 1,525,015 | 2/1925 | Weeks . |
| 1,863,216 | 6/1932 | Wordingham . |
| 1,978,631 | 10/1934 | Herrlinger . |
| 2,048,123 | 7/1936 | Howard . |
| 2,170,147 | 8/1939 | Lane . |
| 2,278,673 | 4/1942 | Savada et al. . |
| 2,302,259 | 11/1942 | Rothfuss . |
| 2,355,559 | 8/1944 | Renner . |
| 2,371,985 | 3/1945 | Freiberg . |
| 2,411,328 | 11/1946 | MacNab . |
| 2,510,120 | 6/1950 | Leander . |
| 2,621,142 | 12/1952 | Wetherell . |
| 2,822,287 | 2/1958 | Avery . |
| 2,846,060 | 8/1958 | Yount . |
| 2,883,262 | 4/1959 | Borin . |
| 3,022,605 | 2/1962 | Reynolds . |
| 3,121,647 | 2/1964 | Harris et al. . |
| 3,130,113 | 4/1964 | Silman . |
| 3,271,922 | 9/1966 | Wallerstein et al. . |
| 3,508,372 | 4/1970 | Wallerstein et al. . |
| 3,620,366 | 11/1971 | Parkinson . |
| 3,681,105 | 8/1972 | Milutin et al. . |
| 3,793,799 | 2/1974 | Howe et al. . |
| 4,054,697 | 10/1977 | Reed et al. . |

(List continued on next page.)

FOREIGN PATENT DOCUMENTS

| | | |
|---|---|---|
| 2610604 | 8/1988 | France . |
| 345464 | 2/1917 | Germany . |

*Primary Examiner*—Linda Johnson
*Attorney, Agent, or Firm*—Dunlap & Codding, PC

[57] ABSTRACT

A method for wrapping a floral grouping with at least one sheet of material of a pad of such sheets of material wherein each sheet of material has an upper surface and a lower surface with an adhesive on at least a portion of the upper surface of the sheet of material and a release material on at least a portion of the lower surface of the sheet of material. The sheet of material is wrapped about the floral grouping so that the adhesive contacts overlapping portions of the sheet of material wrapped about the floral grouping and is bonded to other adjacent portions of the sheet of material.

34 Claims, 4 Drawing Sheets

U.S. PATENT DOCUMENTS

| | | |
|---|---|---|
| 4,118,890 | 10/1978 | Shore . |
| 4,216,620 | 8/1980 | Weder et al. . |
| 4,297,811 | 11/1981 | Weder . |
| 4,300,312 | 11/1981 | Weder et al. . |
| 4,333,267 | 6/1982 | Witte . |
| 4,380,564 | 4/1983 | Cancio et al. . |
| 4,413,725 | 11/1983 | Bruno et al. . |
| 4,546,875 | 10/1985 | Zweber . |
| 4,765,464 | 8/1988 | Ristvedt . |
| 4,996,822 | 3/1991 | Truppe . |
| 5,181,364 | 1/1993 | Weder . |

WRAPPING A FLORAL GROUPING WITH SHEETS HAVING ADHESIVE MATERIAL APPLIED THERETO

CROSS REFERENCE TO RELATED APPLICATIONS

This application is a continuation-in-part of application U.S. Ser. No. 08/253,648, filed Jun. 3, 1994, entitled WRAPPING A FLORAL GROUPING WITH SHEETS HAVING ADHESIVE OR COHESIVE MATERIAL APPLIED THERETO now abandoned; which is a continuation of U.S. Ser. No. 07/965,585, filed Oct. 23, 1992, entitled WRAPPING A FLORAL GROUPING WITH SHEETS HAVING ADHESIVE OR COHESIVE MATERIAL APPLIED THERETO now abandoned; which is a continuation of U.S. Ser. No. 07/893,586, filed Jun. 2, 1992, entitled WRAPPING A FLORAL GROUPING WITH A SHEET HAVING ADHESIVE OR COHESIVE MATERIAL APPLIED THERETO, now U.S. Pat. No. 5,181,364, issue Jan. 26, 1993; which is a continuation of U.S. Ser. No. 07/707,417, filed May 28, 1991, entitled WRAPPING A FLORAL GROUPING WITH A SHEET HAVING ADHESIVE OR COHESIVE MATERIAL APPLIED THERETO, now abandoned; which is a continuation of U.S. Ser. No. 07/502,358, filed Mar. 29, 1990, entitled WRAPPING A FLORAL GROUPING WITH SHEETS HAVING ADHESIVE OR COHESIVE APPLIED THERETO, now abandoned; which is a continuation-in-part of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned; which is a continuation-in-part of U.S. Ser. No. No. 219,083, filed Jul. 13, 1988, entitled ARTICLE FORMING SYSTEM, now U.S. Pat. No. 4,897,031, issued Jan. 30, 1990; which is a continuation of U.S. Ser. No. 07/004,275, filed Jan. 5, 1987 entitled ARTICLE FORMING SYSTEM, now U.S. Pat. No. 4,773,182, issued Sep. 27, 1988; which is a continuation of U.S. Ser. No. 06/613,080, filed May 22, 1984 entitled ARTICLE FORMING SYSTEM, now abandoned.

Said U.S. Ser. No. 07/502,358 is also a continuation-in-part of U.S. Ser. No. 391,463, filed Aug. 9, 1989 entitled ADHESIVE APPLICATOR DISPENSER, now abandoned; which is a continuation-in-part of U.S. Ser. No. 249,761, filed Sep. 26, 1988, entitled METHOD FOR WRAPPING AN OBJECT WITH A MATERIAL HAVING PRESSURE SENSITIVE ADHESIVE THEREON, now abandoned; which is a continuation-in-part of U.S. Ser. No. 219,083, filed Jul. 13, 1988, entitled ARTICLE FORMING SYSTEM, now U.S. Pat. No. 4,897,031, issued Jan. 30, 1990; which is a continuation of U.S. Ser. No. 07/004,275, filed Jan. 5, 1987 entitled ARTICLE FORMING SYSTEM, now U.S. Pat. No. 4,773,182, issued Sep. 27, 1988; which is a continuation of U.S. Ser. No. 06,613,080, filed May 22, 1984 entitled ARTICLE FORMING SYSTEM, now abandoned.

FIELD OF THE INVENTION

The present invention relates generally to the wrapping of a floral grouping with a sheet of material by placing the floral grouping on a top sheet of material of a pad of sheets of material and then wrapping the top sheet of material about the floral grouping and simultaneously disconnecting the top sheet of material from the pad. In one aspect, the present invention relates to the wrapping of a floral grouping with at least one sheet of material by placing the floral grouping on a top sheet of material of a pad of sheets of material having an adhesive on an upper surface of the sheets of material and a release material on a lower surface thereof and then wrapping at least the top sheet of material about the floral grouping and simultaneously disconnecting at least the top sheet of material from the pad.

DESCRIPTION OF THE PREFERRED EMBODIMENTS

A. Description of FIGS. 1–5

Figures 1, 2:
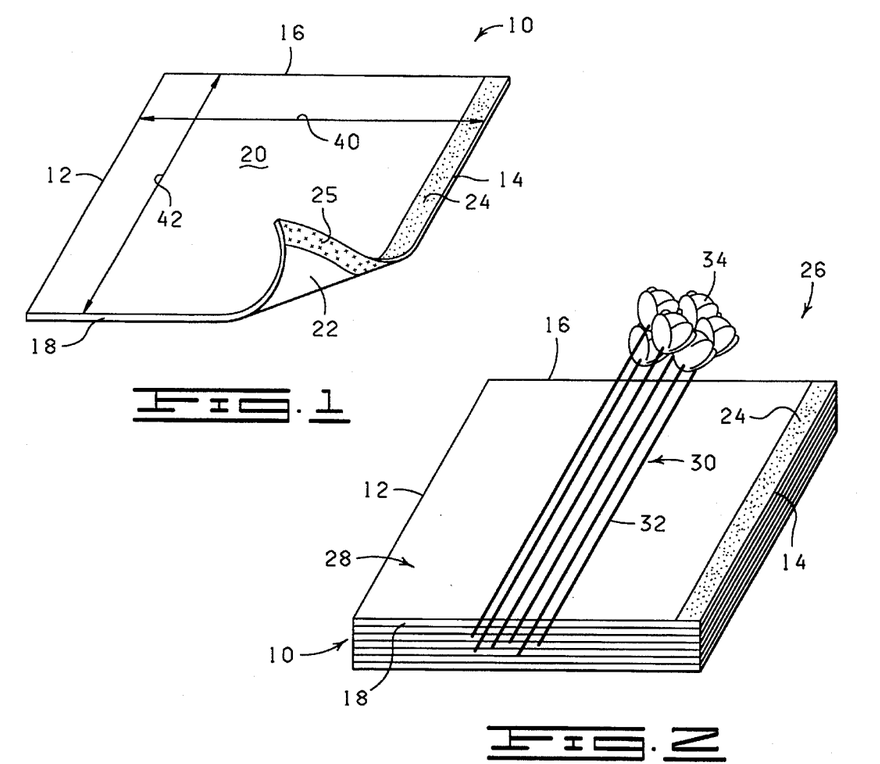
FIG. 1 is a perspective view of a sheet of material of the type contemplated by the present invention wherein one corner of the sheet of material has been lifted to illustrate a portion of a lower surface of the sheet of material.
FIG. 2 is a perspective view of a plurality of sheets of material with each sheet being constructed as shown in FIG. 1 and with the sheets connected together to form a pad of sheets of material, a floral grouping being shown disposed on a portion of the top sheet of material of the pad.

Shown in FIG. 1 is a typical sheet of material 10 constructed in accordance with the present invention. The sheet of material 10 has a first side 12, a second side 14, a first end 16, a second end 18, an upper surface 20 and a lower surface 22. An adhesive material 24 is applied to the upper surface 20 of the sheet of material 10 generally near and extending a distance from the second side 14 thereof with the adhesive material 24 extending generally between the first and the second ends 16 and 18 of the sheet of material 10. The adhesive material 24, as shown in FIG. 1, more particularly, is a strip of the adhesive material 24 applied to the upper surface 20 of the sheet of material 10.

Figure 6:
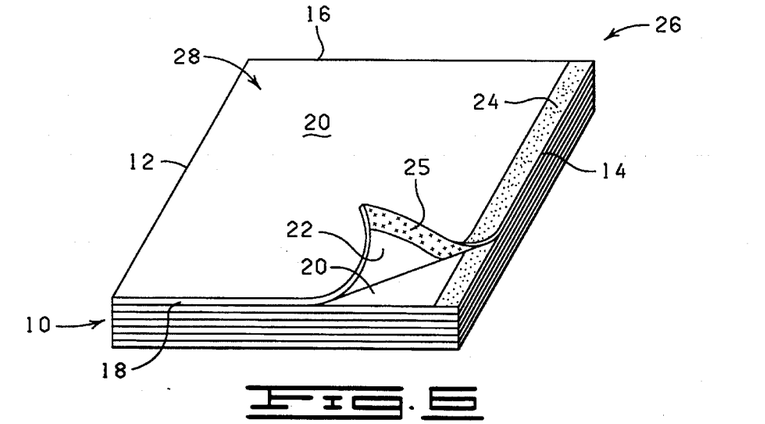
FIG. 6 is a perspective view of a pad of a plurality of sheets of material with each sheet being constructed as shown in FIG. 1 wherein one corner of a top sheet of material has been lifted to illustrate a portion of a lower surface of the sheet of material and wherein the sheets of material are connected together near one side thereof by an adhesive material disposed on a portion of an upper surface of each sheet of material.

A release material 25 is applied to the lower surface 22 of the sheet of material 10 generally near and extending a distance from the second side 14 thereof with the release material 25 extending generally between the first and second ends 16 and 18 of the sheet of material 10. The release material 25 is disposed on the lower surface 22 of the sheet of material 10 so as to be substantially aligned with and in a covering position relative to the adhesive material 24 on the upper surface 20 of an adjacently disposed lower sheet of material 10 substantially as shown in FIG. 6.

In the embodiment shown in FIGS. 1–6, the release material 25 on the lower surface 22 of the sheet of material 10 masks the adhesive material 24 on the upper surface 20 of the adjacently disposed sheet of material 10 in the pad 26 so as to reduce the tackiness of the masked adhesive 24 without adversely affecting the bonding characteristics of the adhesive 24 to connect the sheets of material 10 in the form of the pad 26. By masking the adhesive 24 on the upper surface 20 of the sheets of material 10 in the pad 26 with the release material 25 on the lower surface 22 of the sheets of material 10, one substantially eliminates any discolorization of the adjacently disposed sheet of material 10 due to the adhesive contacting the adjacent sheet of material 10 and, at the same time, enhances the removal of the sheets of material 10 from the pad 26 without substantially sacrificing the adhesive properties of the adhesive material 24 for securing the second side 14 to other portions of the sheet of material 10 when the sheet of material 10 is wrapped about a floral grouping 30 as hereinafter described.

The term "floral grouping" as used herein means cut fresh flowers, artificial flowers, other fresh and/or artificial plants or other floral materials and may include other secondary plants and/or ornamentation which add to the aesthetics of the overall floral grouping.

The term "adhesive material" as used herein means any adhesive composition capable of connecting one side of the sheet of material 10 to other portions of the sheet of material 10 when the sheet of material 10 is wrapped about the floral grouping 30. Such adhesive materials are well known in the art and the adhesive material employed to form the adhesive strip on the upper surface 20 of the sheet of material 10 will be generally dependent upon the construction of the sheet of material 10.

The term "release material" as used herein means a material capable of reducing the tacky properties of the adhesive material 24 when the release material is disposed in a covering position over the adhesive material 24 and which does not adversely effect the binding characteristics of the adhesive material 24 to the sheet of material 10 when the sheet of material 10 is wrapped about a floral grouping. Release materials satisfying the above requirements are well know and include wax and other commercially available release agents such as Release Coat No. 30 marketed by the Michelman Company of Cincinnati, Ohio and an aqueous silicone admixture containing about 14 weight percent "Syl-off 1171" (a silicone containing composition marketed by Dow Corning Co. of Midland, Mich.), about 0.7 weight percent "Syl-off 1171A" (a silicone containing composition marketed by Dow Corning Co. of Midland, Mich.) and about 2 weight percent carboxymethyl cellulose.

The term "binding material" as used herein means any conventional adhesive or adhesive-webbing composition capable of binding one side of the sheets of material 10 to form a pad of the sheets of material 10.

The present invention contemplates a plurality of sheets of material 10 connected together to form a pad 26 of sheets of material 10 as shown in FIGS. 2–6. The pad 26 comprises a plurality of sheets of material 10 stacked one on top of the other and positioned so that the first sides 12, the second sides 14, the first ends 16 and the second ends 18 of the sheets of material 10 in the pad 26 generally are aligned. The upper surface 20 of each sheet of material 10 is disposed generally adjacent the lower surface 22 of an adjacent sheet of material 10 in the pad 26. The adhesive material 24, which functions to connect the sheets of material 10 to form the pad 26 is also employed to bond the second side 14 of the sheet of material 10 to overlapping portions of the sheet of material 10 when the sheet of material 10 is wrapped about a floral grouping 30. Thus, each of the sheets of material 10 in the pad 26 is releasably connected to the other sheets of material 10 via the adhesive material 24 so that one or more sheets of the material 10 can be removed from the pad 26 by lifting one or more sheets of material 10 from the pad 26 and disconnecting the sheet of material 10 from the pad 26.

Figure 3:
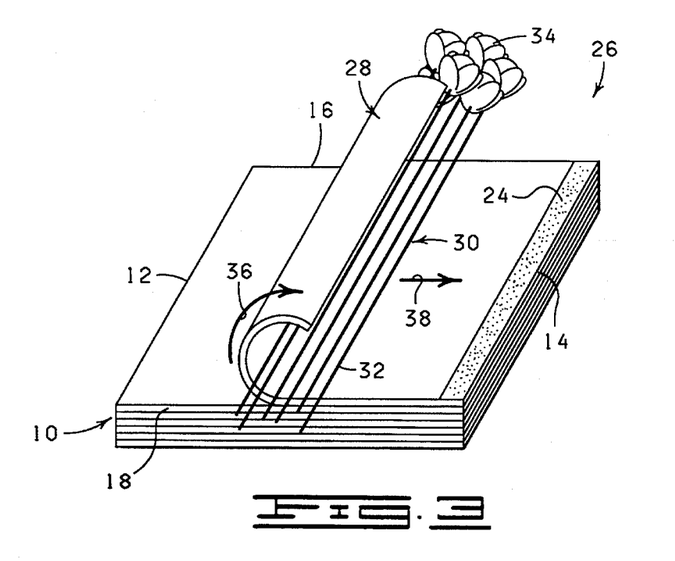
FIG. 3 is a perspective view of the pad, similar to FIG. 2, but showing a portion of the top sheet of material wrapped partially about the floral grouping.
Figures 4, 5:
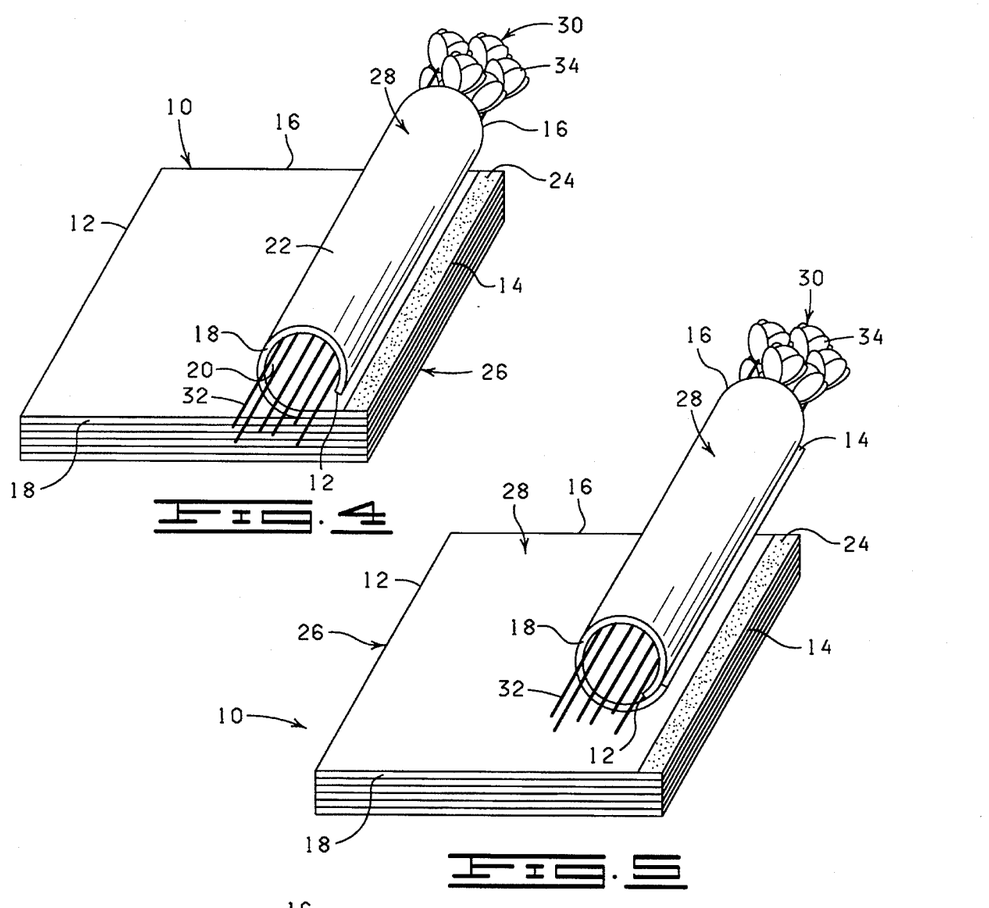
FIG. 4 is a perspective view of the pad shown in FIG. 2 with the top sheet of material wrapped generally about the floral grouping just prior to the top sheet of material being disconnected from the pad.
FIG. 5 is a perspective view of the pad shown in FIGS. 2–4 showing the floral grouping wrapped with the top sheet of material just after the top sheet of material has been disconnected from the pad.

The sheets of material 10 are stacked in the form of the pad 26 thereby providing a top sheet of material 28 which is disposed generally on the top of the pad 26 with the other sheets of material 10 being disposed generally under the top sheet of material 28. The floral grouping 30 having a stem end 32 and a bloom end 34 is placed on a portion of the top sheet of material 28, as shown in FIG. 2, generally near the first side 12 of the top sheet of material 28. An operator then lifts a portion of the top sheet of material 28 generally near the first side 12 thereof and places the lifted portion of the top sheet of material 28 generally about a portion of the floral grouping 30, as shown in FIG. 3. In this position, the top sheet of material 28 and the floral grouping 30 are rolled in a rolling direction 36 (FIG. 3) thereby rolling the top sheet of material 28 generally about the floral grouping 30. The top sheet of material 28 and the floral grouping 30 are continued to be rolled in the rolling direction 36 (FIG. 3) and in the direction 38 generally toward the second side 14 of the top sheet of material 28 until the floral grouping 30 is disposed generally adjacent the second side 14 of the top sheet of material 28, as shown in FIG. 4. In this position, the operator continues to roll the top sheet of material 28 and the floral grouping 30 disposed thereon in the rolling direction 36 and in the direction 38.

As the floral grouping 30 and the top sheet of material 28 are rolled over the adhesive material 24 on the upper surface 20 of the top sheet of material 28, the release material 25 on the lower surface 22 of the top sheet of material 28 enhances the disconnection of the top sheet of material 28 from the pad 26 and the adhesive material 24 on the upper surface 20 of the top sheet of material 28 adhesively connects to an adjacent portion of the top sheet of material 28 thereby securing the top sheet of material 28 securely wrapped generally about the floral grouping 30 so that no loose flaps are formed by unbonded portions of the sheet of material 10, as shown in FIG. 5.

When the top sheet of material 28 has been secured about the floral grouping 30 in the manner just described, the sheet of material 10 generally under the top sheet of material 28 then provides a new top sheet of material 28 and the process can be repeated for wrapping additional or other floral groupings.

Each of the sheets of material 10 has a width 40 (FIG. 1) extending generally between the first and the second sides 12 and 14 thereof sized sufficient whereby each sheet of material 10 can be wrapped about and encompass the floral grouping 30. Each sheet of material 10 has a length 42 (FIG. 1) extending generally between the first and the second ends 16 and 18 thereof sized sufficient whereby the sheet of material 10 extends over a substantial portion of the floral grouping 30 when the sheet of material 10 has been wrapped about the floral grouping 30 in accordance with the present invention.

The sheets of material 10 are constructed from any suitable material that is capable of being wrapped about an item as described herein. Preferably, the material 10 comprises paper (untreated or treated in any manner), cellophane, foil, man-made organic polymer film or combinations thereof. The material 10 also can be cloth (natural or synthetic) or burlap (natural or synthetic) or combinations thereof.

The material 10 may be constructed of a single layer of material or a plurality of layers of the same or different types of materials. Any thickness of the material 10 may be utilized in accordance with the present invention as long as the material 10 is wrappable about an item. Additionally, an insulating material such as bubble film, preferable as one of two layers, can be utilized in order to provide needed protection for the item wrapped in the material 10. In preferred embodiments, the material 10 is constructed from two polypropylene films (a 20"×15" sheet of Mobil 270 ABW white opaque film laminated to a 20"×15" sheet of Mobil 220 AB clear film) or one or more sheets of paper having a thickness in a range of from about 1.0 mil to about 2.5 mils, although the thickness of the sheets of material 10 could be as great as 30 mils.

The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally, a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheetlike format for wrapping purposes consistent with the present invention. For example, one man-made organic polymer film is a polypropylene film.

A decorative pattern, such as a color and/or an embossed pattern, and/or other decorative surface ornamentation may be applied to the upper surface 20 and/or the lower surface 22 of the material 10 or portions thereof including, but not limited to, printed designs, coatings, colors, flocking or metallic finishes. The material 10 also may be totally or partially clear or tinted transparent material.

B. Description of FIGS. 6A and 6B

Figures 6A, 6B:
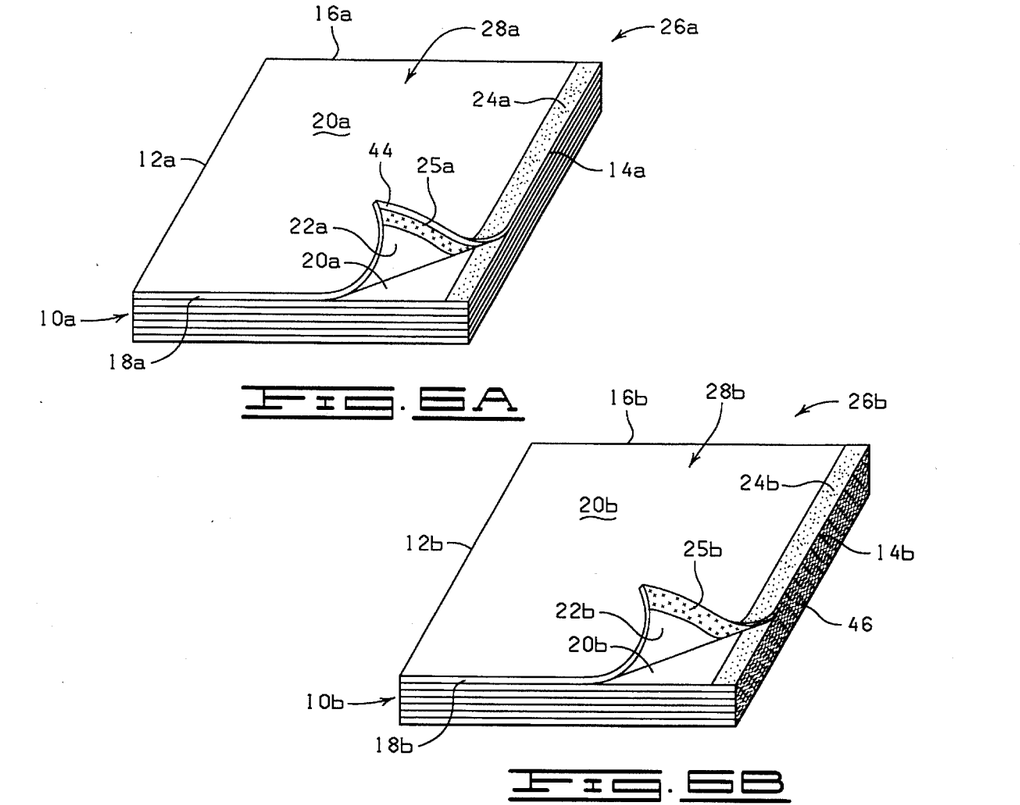
FIG. 6A is a perspective view of a pad of a plurality of sheets of material wherein one corner of the top sheet of material has been lifted to illustrate a portion of a lower surface of the sheet of material and wherein the sheets of material are connected together substantially adjacent one side thereof by an unmasked portion of an adhesive material disposed on the upper surface of each sheet of material.
FIG. 6B is a perspective view of a pad of a plurality of sheets of material wherein one corner of the top sheet of material has been lifted to illustrate a portion of a lower surface of the sheet of material and wherein the sheets of material are bound together along one side thereof.

Referring now to FIG. 6A, a second embodiment of a pad 26a for wrapping the floral grouping 30 in accordance with the present invention is illustrated. The pad 26a contains a plurality of sheets of material 10a with a top sheet 28a disposed on the top of the pad 26a and the remaining sheets of material 10a of the pad 26a disposed generally under the top sheet of material 28a. Each of the sheets of material 10a, including the top sheet of material 28, has a first side 12a, a second side 14a, a first end 16a, a second end 18a, an upper surface 20a and a lower surface 22a. An adhesive material 24a is applied to the upper surface 20a of the each of the sheets of material 10a, including the top sheet of material 28, generally near and extending a distance from the second side 14a thereof with the adhesive material 24a extending generally between the first and the second ends 16a and 18a of each of the sheets of material 10a. The adhesive material 24a is applied to the upper surface 20a of each of the sheets of material 10a substantially as shown.

A release material 25a is applied to the lower surface 22a of each of the sheets of material 10, such as the top sheet of material 28a, a distance from the second side 14a and extending a distance from the second side 14a thereof with the release material 25a extending generally between the first and second ends 16a and 18a of each of the sheets of material 10a. The release material 25a is disposed on the lower surface 22a of each of the sheets of material 10a so as to be substantially aligned with and in a covering position relative to a substantial portion of the adhesive 24a on the upper surface 20a of an adjacently disposed lower sheet of material 10a. The release material 25a on the lower surface 22a of each of the sheets of material 10a masks the adhesive 24a on the upper surface 20a of the adjacently disposed sheet of material 10a in the pad 26a so as to reduce or substantially eliminate the tackiness of the adhesive 24a while in the masked condition without adversely affecting the bonding characteristics of the adhesive 24a except for a portion 44 of the adhesive 25a disposed substantially adjacent the second side 14a of each of the sheets of material 10a. The unmasked portion 44 of the adhesive 25a connects each of the sheets of material 10a in the form of the pad 26a. By masking a substantial portion of the adhesive 24a on the upper surface 20a of the sheets of material 10a in the pad 26a with the release material 25a on the lower surface 22a of each of the sheets of material 10a, one substantially eliminates any discolorization of the adjacently disposed sheet of material 10a to due the adhesive contacting the adjacent sheet of material 10a and, at the same time, enhances the removal of the sheets of material 10a from the pad 26a without substantially sacrificing the adhesive properties of the adhesive 24a.

Referring now to FIG. 6B, another embodiment of a pad 26b for wrapping the floral grouping 30 in accordance with the present invention is illustrated. The pad 26b contains a plurality of sheets of material 10b with a top sheet 28b disposed on the top of the pad 26b and the remaining sheets of material 10b of the pad 26b disposed generally under the top sheet of material 28b. Each of the sheets of material 10b, including the top sheet of material 28b, has a first side 12b, a second side 14b, a first end 16b, a second end 18b, an upper surface 20b and a lower surface 22b. An adhesive material 24b is applied to the upper surface 20b of the each of the sheets of material 10b, such as the top sheet of material 28b generally near and extending a distance from the second side 14b thereof with the adhesive material 24b extending generally between the first and the second ends 16b and 18b of each of the sheets of material 10b. The adhesive material 24b is applied to the upper surface 20b of each of the sheets of material 10b substantially as shown.

A release material 25b is disposed on the lower surface 22b of each of the sheets of material 10b, such as the top sheet of material 28b, so as to be substantially aligned with and in a covering position relative to the adhesive material 24b on the upper surface 20b of an adjacently disposed lower sheet of material 10b. The release material 25b on the lower surface 22b of each of the sheets of material 10b masks the adhesive 24b on the upper surface 20b of the adjacently disposed sheet of material 10b in the pad 26b so as to reduce or substantially eliminate the tackiness of the adhesive 24b while in the masked condition without adversely affecting the bonding characteristics of the adhesive 24b. By masking the adhesive 24b on the upper surface 20b of the sheets of material 10b in the pad 26b with the release material 25b on the lower surface 22b of the sheets of material 10b, one substantially eliminates any discolorization of the adjacently disposed sheet of material 10b due to the adhesive 24b contacting the adjacent sheet of material 10b and, at the same time, permits the removal of the sheets of material 10b from the pad 26b without substantially sacrificing the adhesive properties of the adhesive 24b.

The sheets of material 10b are connected together to form the pad 26b by binding the sheets of material 10b along their second sides 14b with a binding material 46. Any conventional binding material capable of binding the second sides 14b of the sheets of material 10b can be employed as the binding material 46. Such binding materials, as well as the technique for binding sheets of material along one side to form a pad, are well known in the art.

The sheets of material 10a and 10b are constructed from any suitable material that is capable of being wrapped about an item as described herein. Preferably, the materials 10a and 10b comprise paper (untreated or treated in any manner), cellophane, foil, man-made organic polymer film or combinations thereof. The materials 10a and 10b also can be cloth (natural or synthetic) or burlap (natural or synthetic) or combinations thereof.

The materials 10a and 10b may be constructed of a single layer of material or a plurality of layers of the same or different types of materials. Any thickness of the material 10a and 10b may be utilized in accordance with the present invention as long as the materials 10a and 10b are wrappable about an item. Additionally, an insulating material such as bubble film, preferable as one of two layers, can be utilized in order to provide needed protection for the item wrapped in the materials 10a or 10b. In preferred embodiments, the materials 10a and 10b are constructed from two polypropylene films (a 20"×15" sheet of Mobil 270 ABW white opaque film laminated to a 20"×15" sheet of Mobil 220 AB clear film) having a thickness in a range of from about 1.0 mil to about 2.5 mils, although the thickness of the sheets of material 10a and 10b could be as great as 30 mils, or one or more sheets of paper wherein each sheet of paper has a thickness in a range of from about 1.0 mil to about 2.5 mils, although the thickness of the sheets of material 10a and 10b could be as great as 30 mils.

C. Description of FIGS. 7–10

Referring now to FIGS. 7–10, an alternate method for wrapping the floral grouping 30 with at least the top sheet of material 28 of the pad 26 of sheets of material 10 shown in FIG. 6 is illustrated. It should be noted that while an alternate method for wrapping of the floral grouping 30 with the top sheet of material 28 will be described hereinafter, the same alternate method would be employed for wrapping the floral grouping 30 with one or more sheets of material 10a of the pad 26a (FIG. 6A) or with one or more sheets of material 10b of the pad 26b (FIG. 6B).

Figure 7:
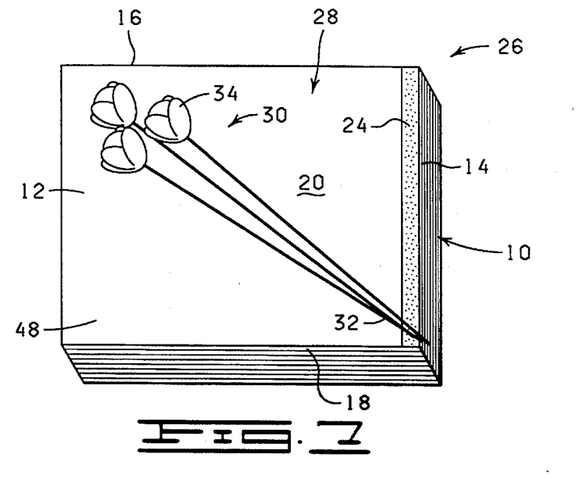
FIG. 7 is a perspective view of a plurality of sheets of material with each sheet being constructed as shown in FIG. 1 and with the sheets connected together to form a pad of sheets of material, a floral grouping being shown disposed on a portion of the top sheet of material of the pad for wrapping of the floral grouping with the top sheet of material in an alternate method.
Figure 8:
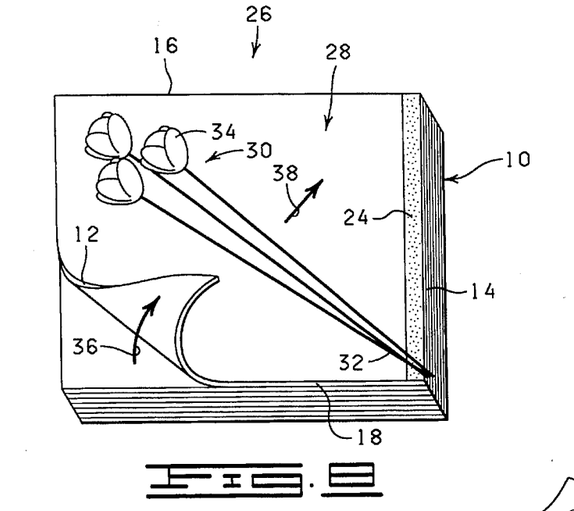
FIG. 8 is a perspective view of the pad shown in FIG. 7, but showing a portion of the top sheet of material wrapped partially about a stem end of the floral grouping.
Figure 9:
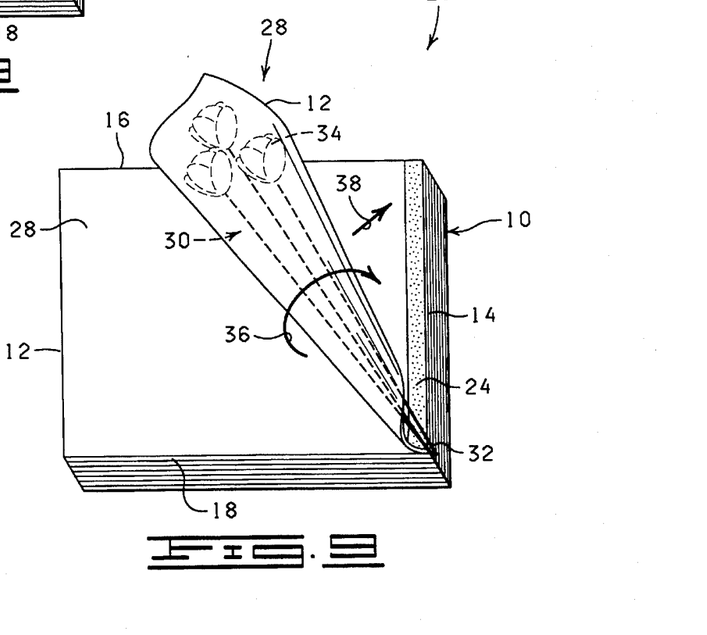
FIG. 9 is a perspective view of the pad shown in FIG. 7 with the top sheet of material being tightly wrapped about the stem end of the floral grouping and loosely wrapped about the flower end of the floral grouping just prior to the top sheet of material being disconnected from the pad.

Referring more specifically to FIG. 7, the floral grouping 30 is shown disposed on a portion of the top sheet of material 28 of the pad 26 so that a portion of the stem end 32 of the floral grouping 30 overlays a portion of the adhesive 24 substantially as shown. To wrap the floral grouping 30 with the top sheet of material 28, an operator lifts a lower corner 48 of the top sheet of material 28 and places the lifted portion of the top sheet of material 28 generally about the bloom end 34 of the floral grouping 30. In this position, the top sheet of material 28 and the floral grouping 30 are rolled in a rolling direction 36 and in the direction 38 generally towards the adhesive 24 disposed along the second side 14 of the top sheet of material 28 (FIGS. 8 and 9) thereby rolling the top sheet of material 28 about the floral grouping 30 to provide a wrapper 50 (FIG. 10) for the floral grouping 30 having an opening 52 extending through a lower end 54 thereof and an opening 56 extending through an upper end 58 thereof. The stem end 32 of the floral grouping 30 extends through the opening 52 in the lower end 54 of the wrapper 50 and the bloom end 34 of the floral grouping 30 is exposed near the opening 56 in the upper end 58 of the wrapper 50. The release material 25 on the lower surface 22 of the top sheet of material 28 (FIG. 6) enhances the disconnection of the top sheet of material 28 from the pad 26.

Figure 10:
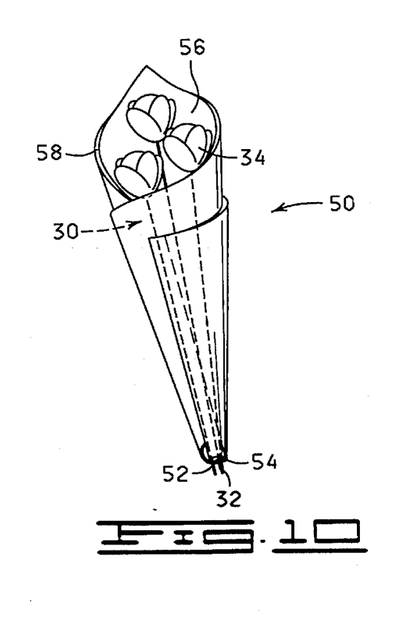
FIG. 10 is an elevational view of the top sheet of material being tightly wrapped about the stem end of the floral grouping and loosely wrapped about the flower end of the floral grouping with a portion of the sheet of material overlapping other portions of the sheet of material and bonded by the adhesive on the upper surface on the sheet of material.

The operator then makes any adjustments desired in the upper end 58 of the wrapper 50 to compensate for the size of the bloom end 34 of the floral grouping 30. Once the wrapping of the top sheet of material 28 about the floral grouping 30 is completed, the operator utilizes the adhesive material 24 to adhesively connect the second side 14 of the top sheet of material 28 to an adjacent portion of the top sheet of material 28 thereby insuring that the resulting wrapper 50 is securely wrapped generally about the floral grouping 30 and there are substantially no flaps formed by unbonded portions of the top sheet of material 28, as shown in FIG. 10.

When the top sheet of material 28 has been secured about the floral grouping 30 in the manner just described, the sheet of material 10 generally under the top sheet of material 28 then provides a new top sheet of material 28 and the process can be repeated for wrapping additional or other floral groupings until substantially all of the sheets of material 10 in the pad 26 have been wrapped about the floral groupings.

While the top sheet of material 28 has been described for wrapping the floral grouping 30, it is to be understood that the floral grouping 30 can be wrapped with a plurality of sheets of material 10 in the manner described with reference to FIGS. 1–5 and 7–10 without departing from the inventive concepts disclosed herein.

Changes may be made in the construction and the operation of the various components, elements and assemblies described herein or in the steps or the sequence of steps of the methods described herein without departing from the spirit and scope of the invention as defined in the following claims.

What is claimed is:

1. A method for wrapping an item, comprising:

providing a pad comprising a plurality of sheets of material, the pad having a top sheet of material with the other sheets of material being disposed under the top sheet of material, each sheet of material having a first end and a second end, an upper surface and a lower surface, each sheet of material having an adhesive on the upper surface of the sheet of material and a release material on the lower surface thereof, the release material being disposed on the lower surface of the sheets of material so that the release material is in a substantially covering position relative to the adhesive on the upper surface of an adjacently disposed lower sheet of material;

providing a floral grouping having an upper end and a stem end, the floral grouping comprising the item;

placing the floral grouping on the top sheet of material; and wrapping at least the top sheet of material about the floral grouping and disconnecting the top sheet of material from the pad of sheets of material with a portion of the sheet of material overlapping other portions of the sheet of material and bonding the overlapping portions of the sheet of material by contacting the adhesive on the upper surface with adjacent overlapping portions of the sheet of material whereby the sheet of material is bonded to overlapping portions of the sheet of material and with the sheet of material substantially encompassing and surrounding a substantial portion of the stem end of the floral grouping and being held about the floral grouping by the bonding of the overlapping portions of the sheet of material, the sheet of material wrapped about the floral grouping having an opening extending through the lower end thereof and an opening extending through the upper end thereof with the stem end of the floral grouping extending through the opening in the lower end and the flower end of the floral grouping being exposed near the opening in the upper end thereof.

2. The method of claim 1 wherein the step of providing the pad of sheets of material is defined further as having the sheets of material bound material along one edge so as to connect the sheets of material into the pad.

3. The method of claim 1 wherein the step of wrapping the top sheet of material about the floral grouping further comprises:

placing a portion of the top sheet of material over at least a portion of the floral grouping and rolling the top sheet of material and the floral grouping and wrapping the top sheet of material about the floral grouping, the adhesive on the top sheet of material being adhesively connected to a portion of the top sheet of material for securing the top sheet of material in a wrapped position about the floral grouping and the top sheet of material being removed from the pad of sheets of material as the top sheet of material is wrapped about the floral grouping.

4. The method of claim 1 wherein the adhesive is on the upper surface of each sheet of material near the second side and extending a distance therefrom toward the first side of each sheet of material, and wherein the release material is on the lower surface of each sheet of material near the second side and extending a distance therefrom toward the first side of each sheet of material, and wherein the step of wrapping the top sheet of material about the floral grouping further comprises:

placing a portion of the top sheet of material over a portion of the floral grouping and rolling the top sheet of material and the floral grouping until the top sheet of material is rolled about the floral grouping, the adhesive on the top sheet of material being adhesively connected to a portion of the top sheet of material as the top sheet of material and the floral grouping is rolled over the adhesive and the top sheet of material being disconnected from the pad as the top sheet of material and floral grouping are rolled over the pad whereby the top sheet of material is lifted from the pad.

5. The method of claim 1 wherein the wrapping of the top sheet of material about the floral grouping and disconnecting the top sheet of material from the pad leaves the next sheet of material forming a new top sheet of material, and wherein the steps of placing the floral grouping on the top sheet of material, and wrapping the top sheet of material about the floral grouping are repeated with other floral groupings until substantially all of the sheets of material in the pad have been wrapped about the floral groupings.

6. The method of claim 1 wherein each sheet of material is constructed from a material in the group of materials consisting of paper, cellophane, foil, organic polymer film, cloth, or burlap or combinations thereof.

7. The method of claim 6 wherein the adhesive is on the upper surface of each sheet of material near the second side and extending a distance therefrom toward the first side of each sheet of material, and wherein the release material is on the lower surface of each sheet of material near the second side and extending a distance therefrom toward the first side of each sheet of material, and wherein the step of wrapping the top sheet of material about the floral grouping further comprises:

placing a portion of the top sheet of material over a portion of the floral grouping and rolling the top sheet of material and the floral grouping until the top sheet of material is rolled about the floral grouping, the adhesive on the top sheet of material being adhesively connected to a portion of the top sheet of material as the top sheet of material and the floral grouping is rolled over the adhesive and the top sheet of material being disconnected from the pad as the top sheet of material and floral grouping are rolled over the pad whereby the top sheet of material is lifted from the pad.

8. The method of claim 6 wherein the adhesive is on the upper surface of each sheet of material near the second side and extending a distance therefrom toward the first side of each sheet of material, and wherein the release material is on the lower surface of each sheet of material near the second side and extending a distance therefrom toward the first side of each sheet of material, and wherein the step of wrapping the top sheet of material about the floral grouping further comprises:

placing a portion of the top sheet of material over a portion of the floral grouping and rolling the top sheet of material and the floral grouping until the top sheet of material is rolled about the floral grouping, the adhesive on the top sheet of material being adhesively connected to a portion of the top sheet of material as the top sheet of material and the floral grouping is rolled over the adhesive and the top sheet of material being disconnected from the pad as the top sheet of material and floral grouping are rolled over the pad whereby the top sheet of material is lifted from the pad.

9. The method of claim 7 wherein each sheet of material has a thickness in a range from about 1 mil to about 30 mils.

10. The method of claim 1 wherein each sheet of material is constructed of paper having a thickness of from about 1 to about 30 mils.

11. The method of claim 10 wherein the adhesive is on the upper surface of each sheet of material near the second side and extending a distance therefrom toward the first side of each sheet of material, and wherein the release material is on the lower surface of each sheet of material near the second side and extending a distance therefrom toward the first side of each sheet of material, and wherein the step of wrapping the top sheet of material about the floral grouping further comprises:

placing a portion of the top sheet of material over a portion of the floral grouping and rolling the top sheet of material and the floral grouping until the top sheet of material is rolled about the floral grouping, the adhesive on the top sheet of material being adhesively connected to a portion of the top sheet of material as the top sheet of material and the floral grouping is rolled over the adhesive and the top sheet of material being disconnected from the pad as the top sheet of material and floral grouping are rolled over the pad whereby the top sheet of material is lifted from the pad.

12. The method of claim 1 wherein each of the sheets of material is constructed of a polymer film.

13. The method of claim 12 wherein the adhesive is on the upper surface of each sheet of material near the second side and extending a distance therefrom toward the first side of each sheet of material, and wherein the release material is on the lower surface of each sheet of material near the second side and extending a distance therefrom toward the first side of each sheet of material, and wherein the step of wrapping the top sheet of material about the floral grouping further comprises:

placing a portion of the top sheet of material over a portion of the floral grouping and rolling the top sheet of material and the floral grouping until the top sheet of material is rolled about the floral grouping, the adhesive on the top sheet of material being adhesively connected to a portion of the top sheet of material as the top sheet of material and the floral grouping is rolled over the adhesive and the top sheet of material being disconnected from the pad as the top sheet of material and floral grouping are rolled over the pad whereby the top sheet of material is lifted from the pad.

14. The method of claim 13 wherein each sheet of material has a thickness in a range from about 1 mil to about 30 mils.

15. A method for wrapping an item comprising:

providing a pad comprising a plurality of sheets of material with the sheets of material being connected to form the pad having a top sheet of material and the other sheets of material being disposed under the top sheet of material, each sheet of material having a first end and a second end, an upper surface and a lower surface, each sheet of material having an adhesive on the upper surface of the sheet of material and a release material on the lower surface of the sheet of material;

providing a floral grouping having a stem end and a flower end, the floral grouping comprising the items;

placing the floral grouping on the top sheet of material; and wrapping the top sheet of material about the floral grouping and disconnecting the top sheet of material from the pad of sheets of material, the sheet of material being wrapped about the floral grouping with portions of the sheet of material overlapping portions of the sheet of material and bonding the overlapping portions of the sheet of material by contacting the adhesive on the upper surface with adjacent overlapping portions of the sheet of material whereby the sheet of material is bonded to overlapping portions of the sheet of material whereby there are substantially no flaps formed by unbonded portions of the sheet of material, and with the sheet of material substantially encompassing and surrounding a substantial portion of the flower end of the floral grouping and a substantial portion of the stem end of the floral grouping and being held about the floral grouping by the bonding of the overlapping portions of the sheet of material, the sheet of material being tightly wrapped about the stem end of the floral grouping, the sheet of material wrapped about the floral grouping having an opening extending through the lower end thereof and an opening extending through the upper end thereof with the stem end of the floral grouping extending through the opening in the lower end and the flower end of the floral grouping being exposed near the opening in the upper end thereof, the upper end of the wrapping being loosely wrapped about the flower end of the floral grouping.

16. The method of claim 15 wherein the step of providing the pad of sheets of material is defined further as having the sheets of material bound material along one edge so as to connect the sheets of material into the pad.

17. The method of claim 16 wherein the step of wrapping the top sheet of material about the floral grouping further comprises:

placing a portion of the top sheet of material over at least a portion of the floral grouping and rolling the top sheet of material and the floral grouping and wrapping the top sheet of material about the floral grouping, the adhesive on the top sheet of material being adhesively connected to a portion of the top sheet of material for securing the top sheet of material in a wrapped position about the floral grouping and the top sheet of material being removed from the pad of sheets of material as the top sheet of material is wrapped about the floral grouping.

18. The method of claim 17 wherein the adhesive is on the upper surface of each sheet of material near the second side and extending a distance therefrom toward the first side of each sheet of material, and wherein the release material is on the lower surface of each sheet of material near the second side and extending a distance therefrom toward the first side of each sheet of material, and wherein the step of wrapping the top sheet of material about the floral grouping further comprises:

placing a portion of the top sheet of material over a portion of the floral grouping and rolling the top sheet of material and the floral grouping until the top sheet of material is rolled about the floral grouping, the adhesive on the top sheet of material being adhesively connected to a portion of the top sheet of material as the top sheet of material and the floral grouping is rolled over the adhesive and the top sheet of material being disconnected from the pad when the top sheet of material and floral grouping are rolled over the pad whereby the top sheet of material is lifted from the pad.

19. The method of claim 18 wherein the wrapping of the top sheet of material about the floral grouping and disconnecting the top sheet of material from the pad leaves the next sheet of material forming a new top sheet of material, and wherein the steps of placing the floral grouping on the top sheet of material, and wrapping the top sheet of material about the floral grouping are repeated with other floral groupings until substantially all of the sheets of material in the pad have been wrapped about the floral groupings.

20. The method of claim 19 wherein each sheet of material is constructed from a material in the group of materials consisting of paper, cellophane, foil, organic polymer film, cloth, or burlap or combinations thereof.

21. The method of claim 20 wherein each sheet of material has a thickness in a range from about 1 mil to about 30 mils.

22. The method of claim 20 wherein each sheet of material is constructed of paper having a thickness of from about 1 to about 30 mils.

23. The method of claim 20 wherein each of the sheets of material is constructed of a polymer film.

24. The method of claim 15 wherein the adhesive is on the upper surface of each sheet of material near the second side and extending a distance therefrom toward the first side of each sheet of material, and wherein the release material is on the lower surface of each sheet of material near the second side and extending a distance therefrom toward the first side of each sheet of material, and wherein the step of wrapping the top sheet of material about the floral grouping further comprises:

placing a portion of the top sheet of material over a portion of the floral grouping and rolling the top sheet of material and the floral grouping until the top sheet of material is rolled about the floral grouping, the adhesive on the top sheet of material being adhesively connected to a portion of the top sheet of material as the top sheet of material and the floral grouping is rolled over the adhesive and the top sheet of material being disconnected from the pad as the top sheet of material and floral grouping are rolled over the pad whereby the top sheet of material is lifted from the pad.

25. The method of claim 24 wherein each sheet of material has a thickness in a range from about 1 mil to about 30 mils.

26. The method of claim 25 wherein each sheet of material is constructed from a material in the group of materials consisting of paper, cellophane, foil, organic polymer film, cloth, or burlap or combinations thereof.

27. The method of claim 26 wherein each of the sheets of material is constructed of a polymer film.

28. The method of claim 26 wherein each of the sheets of material is constructed of paper.

29. A method for wrapping an item comprising:

providing a pad comprising a plurality of sheets of material with the sheets of material being connected to form the pad, the pad having a top sheet of material and the other sheets of material being disposed under the top sheet of material, each sheet of material having a first end and a second end, an upper surface and a lower surface, the sheet of material having an adhesive on the upper surface of the sheet of material and a release material on the lower surface of the sheet material so as to be disposed in a substantially covering position of the adhesive on the upper surface of the adjacently disposed lower sheet of material;

providing a floral grouping having a flower end and a stem end, the floral grouping comprising the item;

placing the floral grouping on the top sheet of material; and wrapping the top sheet of material about the floral grouping and disconnecting the top sheet of material from the pad of sheets of material, the sheet of material being wrapped about the floral grouping with a portion of the sheet of material overlapping other portions of the sheet of material and bonding the overlapping portions of the sheet of material by contacting the adhesive on the upper surface with adjacent overlapping portions of the sheet of material whereby the sheet of material is bonded to overlapping portions of the sheet of material so that there are substantially no loose flaps formed by unbonded portions of the sheet of material, and with the sheet of material substantially encompassing and surrounding a substantial portion of the flower end of the floral grouping and a substantial portion of the stem end of the floral grouping and being held about the floral grouping by the bonding of the overlapping portions of the sheet of material, the sheet of material being tightly wrapped about the stem end of the floral grouping, the sheet of material wrapped about the floral grouping forming a conically shaped wrapping having an opening extending through a lower end and an opening extending through the upper end thereof with the stem end of the floral grouping extending through the opening in the lower end and the flower end of the floral grouping being exposed near the opening in the upper end thereof, the upper end of the wrapping being loosely wrapped about the flower end of the floral grouping.

30. The method of claim 29 wherein the adhesive is on the upper surface of each sheet of material near the second side and extending a distance therefrom toward the first side of each sheet of material, and wherein the release material is on the lower surface of each sheet of material near the second side and extending a distance therefrom toward the first side of each sheet of material, and wherein each sheet of material is constructed from a material in the group of materials consisting of paper, cellophane, foil, organic polymer film, cloth, or burlap or combinations thereof.

31. The method of claim 30 wherein each sheet of material has a thickness in a range from about 1 mil to about 30 mils.

32. The method of claim 31 wherein the adhesive is on the upper surface of each sheet of material near the second side and extending a distance therefrom toward the first side of each sheet of material, and wherein the release material is on the lower surface of each sheet of material near the second side and extending a distance therefrom toward the first side of each sheet of material, and wherein each of the sheets of material is constructed of a polymer film.

33. The method of claim 32 wherein each sheet of material has a thickness in a range from about 1 mil to about 30 mils.

34. The method of claim 31 wherein the adhesive is on the upper surface of each sheet of material near the second side and extending a distance therefrom toward the first side of each sheet of material, and wherein the release material is on the lower surface of each sheet of material near the second side and extending a distance therefrom toward the first side of each sheet of material, and wherein each of the sheets of material is constructed of paper.

* * * * *

UNITED STATES PATENT AND TRADEMARK OFFICE
CERTIFICATE OF CORRECTION

PATENT NO. : 5,598,683

DATED : February 4, 1997

INVENTOR(S) : Weder

It is certified that error appears in the above-identified patent and that said Letters Patent is hereby corrected as shown below:

Cover page, FOREIGN PATENT DOCUMENTS, line 3, please insert --Brochure: Speedcover, Highland Supply Corp., Highland, IL., 1989--.

Cover page, FOREIGN PATENT DOCUMENTS, after line 3, please insert --Post-it® NotePad; 3M Consumer Stationary Div., St. Paul, MN, 1992.

Signed and Sealed this

Fifteenth Day of July, 1997

Attest:

BRUCE LEHMAN

Attesting Officer

Commissioner of Patents and Trademarks